United States Patent Office 3,035,036
Patented May 15, 1962

3,035,036
PREPARATION OF CRYSTALLINE POLYPROPYLENE WITH A TITANIUM-LOWER HALIDE, ALUMINUM ALKYL AND CADMIUM CHLORIDE CATALYST
Robert D. Lundberg, St. Albans, and Frederick E. Bailey, Jr., Charleston, W. Va., assignors to Union Carbide Corporation, a corporation of New York
No Drawing. Filed Apr. 13, 1960, Ser. No. 21,882
7 Claims. (Cl. 260—93.7)

This invention relates to improved methods and to novel catalysts for the production of polypropylene. More particularly, this invention relates to the use of novel catalyst complexes in converting propylene to polymers having high crystallinity, density and stiffness.

It is known that propylene can be polymerized by contacting it with a catalyst complex consisting of an ester or halide salt of a transition metal of group IVA, VA, or VIA of the periodic chart of the atoms and an organometallic compound of a metal of group IA, IIA, or IIIB of the periodic chart of the atoms. When such catalyst complexes are employed in the polymerization of propylene, the resulting polymers are partly crystalline and partly amorphous. The amorphous portions of such polymers are characterized by higher solubilities in organic solvents, and lower densities and stiffness moduli than are the crystalline portions of such polymers. Since the crystalline portions of polypropylene are generally preferred because of their better physical properties, it is desirable to reduce the proportion of amorphous polypropylene obtained in the polymerization of propylene.

In accordance with the instant invention, it has now been discovered that highly crystalline polypropylene, characterized by high density, high stiffness moduli, and low amorphous content, can be produced by contacting propylene with a novel catalyst complex consisting of an organoaluminum compound, a titanium halide wherein the titanium has a valency lower than its maximum possible valency, and cadmium chloride. The highly crystalline polypropylene produced in accordance with this invention is characterized by a density of from about 0.890 to about 0.92 or more, preferably from 0.895 to 0.912, and by a stiffness modulus of from about 60,000 to about 160,000 p.s.i or more, preferably from 80,000 to 150,000 p.s.i  Polypropylene produced in accordance with prior art techniques by contacting propylene with an ester or halide salt of a transition metal of group IVA, VA, or VIA of the periodic chart of the atoms and an organometallic compound of a metal of group IA, IIA, or IIIB of the periodic chart of the atoms is characterized by lower density and stiffness, and a higher amorphous content. By way of illustration, when propylene is polymerized in the presence of a catalyst complex consisting of triisobutylaluminum and titanium trichloride in accordance with the prior art, polymers having a density of less than 0.89, and a stiffness modulus of less than 50,000 p.s.i, are usually obtained. However, when a catalyst complex consisting of triisobutylaluminum, titanium trichloride and cadmium chloride is employed, in accordance with the instant invention, polymers having a density as high as 0.92 or more, and a stiffness modulus as high as 160,000 p.s.i or more, can be obtained.

The nature and chemical structure of the catalyst complexes useful in this invention is not known, but such complexes can be prepared by admixing an organoaluminum compound, a titanium halide wherein the titanium has a valency lower than its maximum possible valency, and cadmium chloride.

The first component of the novel catalyst complexes useful in this invention is an organoaluminum compound which can be represented by the general formula:

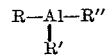

wherein R and R' represent alkyl radicals having from 1 to about 12 carbon atoms, and R" represents a hydrogen or halogen radical, or an alkyl radical having from 1 to about 12 carbon atoms. Preferably R, R' and R" are alkyl radicals having from 4 to about 12 carbon atoms. Illustrative of the organoaluminum compounds suitable for use in the instant invention are such compounds as triisobutylaluminum, trioctylaluminum, tri-n-butylaluminum, triethylaluminum, triisopropylaluminum, tridodecylaluminum, diethylmethylaluminum, diethylisobutylaluminum, diisobutylethylaluminum, diethylaluminum chloride, diethylaluminum bromide, diisobutylaluminum chloride, diisobutylaluminum bromide, dioctylaluminum chloride, didodecylaluminum chloride, diethylaluminum hydride, diisobutylaluminum hydride, dioctylaluminum hydride, didodecylaluminum hydride and the like. These compounds can be employed individually or in various mixtures thereof.

The second component of the novel catalyst complexes useful in this invention is a titanium halide wherein the titanium has a valency lower than its maximum possible valency. Preferably, the halide employed is a chloride, but fluorides, bromides, and iodides can also be employed. Illustrative of the halides suitable for use in the instant invention are such compounds as titanium trichloride, titanium dichloride, titanium trifluoride, titanium tribromide, titanium triiodide and the like. These compounds can be employed individually or in various mixtures thereof.

The third component of the novel catalyst complexes useful in this invention is cadmium chloride. The use of this third component is essential in order to obtain highly crystalline polypropylene.

The crystallinity, density and stiffness of the propylene polymers produced by contacting propylene with the novel catalyst complexes of the instant invention will vary according to the ratio in which the catalyst components are employed. In general, increasing the proportional amount of cadmium chloride in the catalyst complex increases the crystallinity, density and stiffness of the resulting polymers, but also serves to decrease the yield in which such polymers are obtained and the productivity of the catalyst. Conversely, decreasing the proportional amount of cadmium chloride in the catalyst complex generally increases the yield of polymer and the productivity of the catalyst, but decreases the crystallinity, density and stiffness of such polymers.

In order to obtain polymers having high crystallinity, density and stiffness in highest yields at highest catalyst productivity, it is preferable to employ catalyst complexes containing from about 25 mole percent to about 85 mole percent of cadmium chloride based on the catalyst complex; however, catalyst complexes containing greater or lesser amounts of cadmium chloride, for example, catalyst complexes containing from about 20 mole percent to about 90 mole percent of cadmium chloride, can also be advantageously employed to obtain highly crystalline polymers in satisfactory yields at satisfactory catalyst productivity.

The remainder of the catalyst complex is made up of the organoaluminum compound and the titanium halide. The latter two components should be employed in the catalyst complex in molar ratios of organoaluminum compound to titanium halide of from about 10:1 to about 1:5, preferably from 5:1 to 1:1.

Polymerization of propylene according to the instant invention can be effected by contacting propylene, either in the liquid or gaseous state, with the novel catalyst complexes of the instant invention. By way of illustration, polymerization can be effected by continuously bubbling gaseous propylene through the catalyst complex. Polymerization can also be effected by initially sealing a fixed amount of either the liquid or gaseous monomer and the catalyst complex in a polymerization reactor and allowing the reaction to proceed under autogenous pressure with, if desired, further batchwise additions of monomer or catalyst components. In any event, reactive contact between the monomer and catalyst complex should be maintained by constant stirring or agitation of the reaction mixture in order to obtain maximum polymerization. Care should be taken to exclude air and moisture from contact with the reaction mixture since these substances interfere with polymerization. Such can be accomplished by techniques well known in the art.

The novel catalyst complexes useful in polymerizing propylene to highly crystalline polymers according to the instant invention are preferably employed for such purpose in an inert liquid hydrocarbon which serves as a diluent for the reaction. By an "inert liquid hydrocarbon" is meant a liquid hydrocarbon which is nonreactive under the polymerization conditions employed in the process of the instant invention. While the hydrocarbons selected need not function as solvent for the catalyst complex or the polymers obtained by the process of the invention, they usually serve as solvent for the propylene monomer employed in the polymerization. Among the inert liquid hydrocarbons applicable for such purpose may be mentioned saturated aliphatic hydrocarbons such as hexane, heptane, isooctane, highly purified kerosene, and the like; saturated cycloaliphatic hydrocarbons such as cyclohexane, methylcyclohexane, and the like; and aromatic hydrocarbons such as benzene, toluene, xylene, and the like.

When an inert liquid hydrocarbon is employed as a diluent for the novel catalyst complexes of this invention, the total amount of catalyst complex dispersed in such diluent is not narrowly critical and can vary over a wide range. Suitable mixtures of catalyst complex and diluent can be prepared by dispersing sufficient amounts of catalyst complex in the diluent to provide a concentration of from 0.1 percent by weight to 10.0 percent by weight, preferably from 0.5 percent by weight to 1.0 percent by weight, of such catalyst composition in the admixture. While polymerization proceeds at concentrations outside the limits of the broadly disclosed range, no commensurate advantages are obtained by employing such concentrations.

The amount of catalyst complex employed in polymerizing propylene according to the process of the instant invention can vary over a wide range. In general, such catalyst complex should be employed in an amount of from about 0.5 percent by weight to about 10 percent by weight, preferably from 0.5 percent by weight to 5 percent by weight, of the total amount of propylene monomer to be employed. While polymerization proceeds at concentrations outside the limits of the broadly disclosed range, no commensurate advantages are obtained by employing such concentrations.

While the catalyst components and diluents useful in this invention can be mixed in any desired order, it has been found that higher yields of polymer are obtained if the organoaluminum compound is added to the diluent first, followed by the addition of the cadmium chloride and the titanium halide, in that order. An alternative procedure is to grind the titanium halide and the cadmium chloride together, and then disperse the mixture in the diluent before adding the organoaluminum compound thereto. Since water destroys the effectiveness of the resulting complexes to act as catalysts, techniques designed to exclude moisture should be employed during and after their preparation.

The pressures employed in effecting polymerization according to the instant invention can vary over a wide range. Polymerization is preferably effected at pressures ranging from about 1 atmosphere to about 20 atmospheres; however, pressures both above and below the disclosed preferred range, for example pressures ranging from as low as 0.5 atmosphere to as high as 1000 atmospheres, can also be employed whenever it is desirable to do so.

Polymerization of propylene to highly crystalline polymers according to the instant invention readily occurs at temperatures ranging from as low as 0° C. to as high as 100° C., but is preferably effected at temperatures ranging from about 25° C. to about 75° C. Temperatures both above and below the broadly disclosed range can also be employed; however, no commensurate advantages are obtained by employing temperatures outside the limits of the broadly disclosed range.

After the polymerization reaction is complete, the catalyst complex can be inactivated by the addition thereto of a suitable quenching agent, such as, for example, an alcohol such as isopropanol. The polymer formed by the reaction can then be separated from the reaction mixture by conventional procedures well known in the art. As the polymer is generally insoluble in the reaction mixture, separation can usually be readily accomplished by filtration. Catalyst residues can be further removed from the polymer by washing with suitable solvents, such as, for example, an alcohol such as isopropanol.

The polypropylene produced in accordance with this invention can be employed in the many uses commonly made of such material, such as in the production of fibers, films, coatings, molded articles and the like.

The term "stiffness," as employed throughout this specification, refers to the secant modulus of elasticity of a polymer as measured by an Instron tester. This tester is manufactured by the Instron Engineering Company of Quincy, Mass. (Model TTB). The stiffness modulus is calculated by multiplying by 100 the force in pounds per square inch necessary to stretch a sample of the polymer having a cross sectional area of one square inch one percent of its original length at a rate of one percent per minute.

The term "melt index," as employed throughout this specification, is the rate at which a polymer is extruded through a die having a diameter of 0.0825 inch in accordance with the procedure described in ASTM test procedure D-1238-52T. This property is expressed in decigrams per minute, and is determined by placing a ten gram sample in a tube having a diameter of ⅜ of an inch, and applying a load of 2160 grams, at a temperature of 190° C., to a plunger which forces the melted polymer through a die having a diameter of 0.0825 inch. Polymers of high molecular weight extrude more slowly and therefore have a lower melt index.

Unless otherwise specified, all parts and percentages as used throughout this specification, are by weight. All p.s.i. measurements are expressed in absolute values. The periodic chart of the atoms referred to throughout this specification is the 1956 revised edition published by W. M. Welch Manufacturing Company, 1515 Sedgwick Street, Chicago, Illinois, U.S.A.

The following examples are set forth for purposes of illustration so that those skilled in the art may better understand this invention, and it should be understood that they are not to be construed as limiting this invention in any manner.

EXAMPLE I

Into a nitrogen-purged 300-ml. Pyrex polymerization bottle, were placed, in the order stated, 200 ml. of anhydrous heptane, a solution of 2.0 grams of triisobutyl-aluminum in 10 ml. of anhydrous heptane, and 1.0 gram of anhydrous cadmium chloride. The mixture was allowed to stand for five minutes, following which time a suspension of 0.5 gram of finely-divided, crystalline, purple titanium trichloride in 5 ml. of anhydrous heptane was added thereto. After cooling the bottle in a Dry Ice bath, 40 grams of liquid propylene were added and the bottle was capped and rotated for 22 hours in a water bath maintained at a temperature of 50° C. Following this, the reaction bottle was again cooled in a Dry Ice bath. After the contents of the bottle had been cooled to the temperature of the bath, the bottle cap was removed and the contents of the bottle were poured into about 1000 ml. of isopropanol in order to inactivate the catalyst. The polypropylene present in the mixture was recovered by filtration and washed successively with (1) a solution containing 0.3 percent by weight of hydrochloric acid in isopropanol, (2) a solution containing 10 percent by weight of isopropanol in water, and finally with (3) a solution containing 0.2 percent by weight of 4,4-thiobis-6-tertiary - butylmetacresol in isopropanol. The white crystalline polypropylene product was then dried at a temperature of 50° C. for 20 hours. About 29.8 grams of highly crystalline polypropylene having a melt index of 0.11 decigram per minute, a stiffness of 75,500 p.s.i. at 25° C. and a density of 0.9017 gram/ml. at 25° C. were obtained.

EXAMPLE II

The polymerization procedure described in Example I was repeated without the addition of anhydrous cadmium chloride to the reaction mixture. About 37.8 grams of polypropylene having a melt index of 0.032 decigram per minute, a stiffness of only 30,260 p.s.i. at 25° C. and a density of only 0.8894 gram/ml. at 25° C. were recovered.

EXAMPLE III

The polymerization procedure described in Example I was repeated. About 34.3 grams of highly crystalline polypropylene having a stiffness of 106,300 p.s.i. at 25° C. and a density of 0.9076 gram/ml. at 25° C. were obtained.

EXAMPLE IV

The polymerization procedure described in Example I was repeated at a temperature of 25° C. employing a catalyst complex prepared from 1 gram of triisobutylaluminum, 1 gram of anhydrous cadmium chloride, and 0.5 gram of titanium trichloride. The polypropylene recovered weighed 9.7 grams and had a stiffness of 126,800 p.s.i. at 25° C. and a density of 0.9116 gram/ml. at 25° C.

EXAMPLE V

The polymerization procedure described in Example IV was repeated without the addition of anhydrous cadmium chloride to the reaction mixture. The polypropylene recovered had a stiffness of only 28,165 p.s.i. at 25° C. and a density of only 0.8800 gram/ml. at 25° C.

EXAMPLE VI

The polymerization procedure described in Example I was repeated at a temperature of 75° C. employing 20 grams of propylene and a catalyst complex prepared from 1 gram of triisobutylaluminum, 1 gram of anhydrous cadmium chloride, and 0.5 gram of titanium trichloride. The polypropylene recovered weighed 3.1 grams and had a stiffness of 140,000 p.s.i. at 25° C. and a density of 0.9108 gram/ml. at 25° C.

EXAMPLE VII

The polymerization procedure described in Example VI was repeated without the addition of anhydrous cadmium chloride to the reaction mixture. The polypropylene recovered had a stiffness of only 51,700 p.s.i. at 25° C. and a density of only 0.8912 gram/ml. at 25° C.

EXAMPLE VIII

The polymerization procedure described in Example I was repeated at a reaction time of 17 hours employing a catalyst complex prepared from 0.57 gram of triethylaluminum, 1.0 gram of anhydrous cadmuim chloride, and 0.5 gram of purple titanium trichloride. The polypropylene recoveerd had a stiffness of 60,900 p.s.i. at 25° C. and a density of 0.8956 gram/ml. at 25° C.

EXAMPLE IX

The polymerization procedure described in Example VIII was repeated without the addition of anhydrous cadmium chloride to the reaction mixture. The polypropylene recovered had a stiffness of only 49,300 p.s.i. at 25° C. and a density of 0.8936 gram/ml. at 25° C.

EXAMPLE X

The polymerization procedure described in Example I was repeated at a reaction time of 17 hours employing a catalyst complex prepared from 0.9 gram of diisobutylaluminum chloride, 1.0 gram of anhydrous cadmium chloride, and 0.5 gram of purple titanium trichloride. The polypropylene recovered had a stiffness of 79,500 p.s.i. at 25° C. and a density of 0.8968 gram/ml. at 25° C.

EXAMPLE XI

The polymerization procedure described in Example X was repeated without the addition of anhydrous cadmium chloride to the reaction mixture. The polypropylene recovered had a stiffness of only 55,100 p.s.i. at 25° C. and a density of only 0.8848 gram/ml. at 25° C.

EXAMPLE XII

Into a nitrogen-purged 300-ml. Pyrex polymerization bottle, were placed, in the order stated, 200 ml. of anhydrous heptane, a solution of 1.0 gram of triisobutylaluminum in 10 ml. of anhydrous heptane, and 1.0 gram of anhydrous cadmium chloride. The mixture was allowed to stand for ten minutes, following which time a suspension of 0.5 gram of finely-divided, crystalline, purple titanium trichloride in 5 ml. of anhydrous heptane was added thereto. After cooling the bottle in a Dry Ice bath, 40 grams of liquid propylene were added and the bottle was capped and rotated for 22 hours in a water bath maintained at a temperature of 50° C. Following this, the reaction bottle was again cooled in a Dry Ice bath. After the contents of the bottle had been cooled to the temperature of the bath, the bottle cap was removed and he contents of the bottle were poured into about 1000 ml. of isopropanol in order to inactivate the catalyst. The polypropylene present in the mixture was recovered by filtration and washed successively with (1) a solution containing 0.3 percent by weight of hydrochloric acid in isopropanol, (2) a solution containing 10 percent by weight of isopropanol in water, and finally with (3) a solution containing 0.2 percent by weight of 4,4-thiobis-6-tertiarybutylmetacresol in isopropanol. The crystalline polypropylene product was then dried at a temperature of 50° C. for 20 hours. The polypropylene product weighed 6.4 grams and had a stiffness of 123,800 p.s.i. at 25° C. and a density of 0.8990 gram/ml. at 25° C.

EXAMPLE XIII

The polymerization procedure described in Example I was repeated replacing the anhydrous cadmium chloride with anhydrous zinc chloride. About 38.9 grams of highly crystalline polypropylene having a stiffness of 61,600 p.s.i. at 25° C. and a density of 0.8877 gram/ml. at 25° C. were obtained.

EXAMPLE XIV

The polymerization procedure described in Example I was repeated several times employing a reaction time of 67 hours while varying the amounts of the catalyst components charged. The following table illustrates how the crystallinity, density and stiffness of the polypropylene obtained can be varied by varying the ratio of the catalyst components employed.

Table A

| Run | Catalyst (grams) | | | Yield (grams) | Polymer Properties | |
|---|---|---|---|---|---|---|
| | Al(isobutyl)₃ | CdCl₂ | TiCl₃ | | Density (grams/ml. at 25° C.) | Stiffness (p.s.i. at 25° C.) |
| A | 1.0 | 1.0 | 0.5 | 36.7 | 0.9057 | 104,000 |
| B | 4.0 | 5.0 | 0.5 | 34.7 | 0.9083 | 141,000 |

A comparison of Examples I and II, Examples IV and V, Examples VI and VII, Examples VIII and IX, and Examples X and XI series to readily illustrate how the crystallinity, density and stiffness of propylene polymers can be improved by polymerizing propylene with catalyst complexes containing cadmium chloride. The polymers having the highest stiffness and density values are, of course, the most crystalline, the stiffness and density values of a polymer being directly correlative measures of the crystallinity of the polymer. As is well known in the art, amorphous polypropylene is soluble in hydrocarbons such as toluene and heptane, while crystalline polypropylene is insoluble therein. Amorphous polypropylene can be separated from crystalline polypropylene by boiling the two materials in a hydrocarbon such as toluene or heptane, cooling the mixture to room temperature, and then filtering the mixture to separate the insoluble crystalline polypropylene. The following example illustrates the density and stiffness of propylene polymers produced in accordance with the instant invention and the low solubility of such polymers in refluxing heptane.

EXAMPLE XV

Into each of four nitrogen-purged 300-ml. Pyrex polymerization bottles, were placed, in the order stated, 200 ml. of anhydrous heptane, a solution of 2.0 grams of triisobutylaluminum in 10 ml. of anhydrous heptane, and 2.0 grams of anhydrous cadmium chloride. The mixtures were shaken well and allowed to stand for one half hour, following which time a suspension of 0.5 gram of finely-divided, crystalline, purple titanium trichloride in 5 ml. of anhydrous heptane was added to each bottle. After cooling the bottles in a Dry Ice bath, 40 grams of liquid propylene were added to each bottle. The bottles were then capped and rotated for three days in a water bath maintained at a temperature of 50° C. Following this, the reaction bottles were again cooled in a Dry Ice bath. After the contents of the bottles had been cooled to the temperature of the bath, the bottles were removed and the contents of each of the bottles were poured into about 1000 ml. of isopropanol in order to inactivate the catalyst. The polypropylene present in each mixture was recovered by filtration and washed successively with (1) a solution containing 0.3 percent by weight of hydrochloric acid in isopropanol, (2) a solution containing 10 percent by weight of isopropanol in water, and finally with (3) a solution containing 0.2 percent by weight of 4,4-thiobis-6-tertiarybutylmetacresol in isopropanol. The white crystalline polypropylene product was then dried at a temperature of 50° C. for 20 hours. The total amount of polypropylene obtained was 137.1 grams. The polypropylene had a melt index of 0.083 decigram per minute, a stiffness of 153,281 p.s.i. at 25° C. and a density of 0.9096 gram/ml. at 25° C. Continuous extraction of the polypropylene in a Soxhlet extractor using refluxing heptane over a period of 24 hours resulted in the extraction of only 7.8 percent by weight of the polymer.

What is claimed is:
1. A process for producing highly crystalline polypropylene which comprises contacting propylene with a catalyst complex consisting of an organoaluminum compound which can be represented by the general formula:

$$\text{R}-\underset{\underset{\text{R}'}{|}}{\text{Al}}-\text{R}''$$

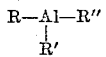

wherein R and R' are alkyl radicals having from 1 to about 12 carbon atoms, and R'' is a radical selected from the group consisting of hydrogen, halogen and alkyl radicals having from 1 to about 12 carbon atoms; a titanium halide wherein the titanium has a valency lower than its maximum possible valency; and cadmium chloride; said catalyst complex containing from 20 mole percent to 90 mole percent of cadmium chloride based on the catalyst complex.

2. A process for producing highly crystalline polypropylene which comprises contacting propylene in an inert liquid hydrocarbon with a catalyst complex consisting of an organoaluminum compound which can be represented by the general formula:

$$\text{R}-\underset{\underset{\text{R}'}{|}}{\text{Al}}-\text{R}''$$

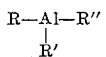

wherein R and R' are alkyl radicals having from 1 to about 12 carbon atoms, and R'' is a radical selected from the group consisting of hydrogen, halogen and alkyl radicals having from 1 to about 12 carbon atoms; a titanium halide wherein the titanium has a valency lower than its maximum possible valency; and cadmium chloride; said catalyst complex containing from 20 mole percent to 90 mole percent of cadmium chloride based on the catalyst complex, the remainder of said catalyst complex being composed of from 80 mole percent to 10 mole percent of organoaluminum compound and titanium halide in a molar ratio of organoaluminum compound to titanium halide of from about 10:1 to about 1:5.

3. A process for producing highly crystalline polypropylene which comprises contacting propylene in an inert liquid hydrocarbon with a catalyst complex consisting of a trialkylaluminum compound wherein the alkyl groups present each contain from 4 to about 12 carbon atoms, a titanium chloride wherein the titanium has a valency lower than its maximum possible valency, and cadmium chloride, said catalyst complex containing from 20 mole percent to 90 mole percent of cadmium chloride based on the catalyst complex, the remainder of said catalyst complex being composed of from 80 mole percent to 10 mole percent of trialkylaluminum compound and titanium chloride in a molar ratio of trialkylaluminum compound to titanium chloride of from about 10:1 to about 1:5.

4. A process for producing highly crystalline polypropylene which comprises contacting propylene in an inert liquid hydrocarbon with a catalyst complex consisting of triisobutylaluminum, titanium trichloride and cadmium chloride; said catalyst complex containing from 20 mole percent to 90 mole percent of cadmium chloride based on the catalyst complex.

5. A catalyst complex for polymerizing propylene to highly crystalline polypropylene consisting of the product formed by admixing an organoaluminum compound which can be represented by the general formula:

$$\text{R}-\underset{\underset{\text{R}'}{|}}{\text{Al}}-\text{R}''$$

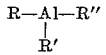

wherein R and R' are alkyl radicals having from 1 to about 12 carbon atoms, and R'' is a radical selected from the group consisting of hydrogen, halogen and alkyl radicals having from 1 to about 12 carbon atoms; a titanium halide wherein the titanium has a valency lower than its maximum possible valency; and cadmium chloride; said catalyst complex containing from 20 mole percent to 90 mole percent of cadmium chloride based on the catalyst complex.

6. A catalyst complex for polymerizing propylene to highly crystalline polypropylene consisting of the product formed by admixing a trialkylaluminum compound wherein the alkyl groups present each contain from 4 to about 12 carbon atoms, a titanium chloride wherein the titanium has a valency lower than its maximum possible valency, and cadmium chloride; said catalyst complex containing from 20 mole percent to 90 mole percent of cadmium chloride based on the catalyst complex.

7. A catalyst complex for polymerizing propylene to highly crystalline polypropylene consisting of the product formed by admixing triisobutylaluminum, titanium trichloride and cadmium chloride; said catalyst complex containing from 20 mole percent to 90 mole percent of cadmium chloride based on the catalyst complex.

References Cited in the file of this patent

UNITED STATES PATENTS 2,909,511    Thomas _____ Oct. 20, 1959

FOREIGN PATENTS 798,447    Great Britain _____ July 23, 1958